(12) United States Patent
Roberts et al.

(10) Patent No.: US 9,303,170 B2
(45) Date of Patent: Apr. 5, 2016

(54) AQUEOUS PIGMENT DISPERSIONS WITH COMPONENTS TO INTERACT WITH CELLULOSE

(71) Applicant: E I DU PONT DE NEMOURS AND COMPANY, Wilmington, DE (US)

(72) Inventors: C. Chad Roberts, Hockessin, DE (US); Christian Jackson, Wilmington, DE (US); Patrick F. McIntyre, West Chester, PA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 14/368,656

(22) PCT Filed: Dec. 27, 2012

(86) PCT No.: PCT/US2012/071695
§ 371 (c)(1),
(2) Date: Jun. 25, 2014

(87) PCT Pub. No.: WO2013/101856
PCT Pub. Date: Jul. 4, 2013

(65) Prior Publication Data
US 2014/0378606 A1  Dec. 25, 2014

Related U.S. Application Data

(60) Provisional application No. 61/581,741, filed on Dec. 30, 2011.

(51) Int. Cl.
| | | |
|---|---|---|
| *C09D 7/12* | (2006.01) | |
| *C09D 11/107* | (2014.01) | |
| *C09D 11/10* | (2014.01) | |
| *C09D 11/326* | (2014.01) | |
| *C09D 17/00* | (2006.01) | |
| *C09D 11/104* | (2014.01) | |
| *C08K 3/00* | (2006.01) | |
| *C08K 5/00* | (2006.01) | |

(52) U.S. Cl.
CPC ............... *C09D 7/125* (2013.01); *C09D 11/10* (2013.01); *C09D 11/104* (2013.01); *C09D 11/326* (2013.01); *C09D 17/001* (2013.01); *C08K 3/0033* (2013.01); *C08K 5/0041* (2013.01)

(58) Field of Classification Search
None
See application file for complete search history.

(56) References Cited

U.S. PATENT DOCUMENTS

| | | | |
|---|---|---|---|
| 4,597,794 | A |  7/1986 | Ohta et al. |
| 5,022,592 | A |  6/1991 | Zakheim et al. |
| 5,026,427 | A |  6/1991 | Mitchell et al. |
| 5,085,698 | A |  2/1992 | Ma et al. |
| 5,231,131 | A |  7/1993 | Chu et al. |
| 5,580,373 | A | 12/1996 | Lane et al. |
| 5,679,138 | A | 10/1997 | Bishop et al. |
| 5,891,231 | A |  4/1999 | Gnerlich et al. |
| 5,976,232 | A | 11/1999 | Gore |
| 6,117,921 | A |  9/2000 | Ma et al. |
| 6,262,152 | B1 |  7/2001 | Fryd et al. |
| 6,306,994 | B1 | 10/2001 | Donald et al. |
| 6,433,117 | B1 |  8/2002 | Ma et al. |
| 6,972,303 | B1 * | 12/2005 | Miyabayashi et al. ......... 523/160 |
| 7,417,102 | B2 * |  8/2008 | Ohrbom et al. ............. 526/307.3 |
| 8,362,140 | B2 *  |  1/2013 | Fujimaki et al. .............. 524/559 |
| 2003/0089277 | A1 |  5/2003 | Zakheim et al. |
| 2004/0102541 | A1* |  5/2004 | Sacoto et al. ................. 523/160 |
| 2005/0090599 | A1 |  4/2005 | Spinelli |
| 2007/0100023 | A1 |  5/2007 | Burns |
| 2008/0264298 | A1 | 10/2008 | Burns |
| 2010/0021635 | A1 |  1/2010 | Ookawa et al. |
| 2011/0077319 | A1 |  3/2011 | Yasuda |

FOREIGN PATENT DOCUMENTS

EP       0556649 A1      4/1993

OTHER PUBLICATIONS

H. Spinelli, "Polymeric Dispersants in Ink Jet Technology", Advanced Materials, 1998, vol. 10, No. 15, 1215-1218.
International Search Report for PCT/US2012/071695, Dated Feb. 3, 2013, by the USPTO.

* cited by examiner

*Primary Examiner* — Vu A Nguyen
(74) *Attorney, Agent, or Firm* — Simon L. Xu

(57) ABSTRACT

Aqueous pigment dispersions having components in the dispersant capable of interacting with cellulose are described. These components include a heterocycle substituted to the oxygen atom of an acrylate ester. The heterocycle is selected based on its Hansen solubility parameters.

12 Claims, No Drawings

AQUEOUS PIGMENT DISPERSIONS WITH COMPONENTS TO INTERACT WITH CELLULOSE

CROSS REFERENCE TO RELATED APPLICATIONS

This application claims priority under 35 U.S.C. §119 from U.S. Provisional Application Ser. No. 61/581,741, filed Dec. 30, 2011 which is incorporated by reference in its entirety.

BACKGROUND OF THE DISCLOSURE

The present disclosure pertains to aqueous pigment dispersions based on polymeric dispersants having heterocyclic functionalities capable of interacting with cellulose. These dispersions may be used to prepare aqueous inkjet inks, paints, and the like.

Dispersion methods are commonly used to disperse particles. A variety of dispersion processes have been described for using polymeric dispersants for dispersing particles. Often the monomers used for the polymeric dispersants are chosen to optimize the stability of the pigment dispersion, rather than to optimize the utility of the pigment dispersions.

Alternatively, the polymeric dispersants can be optimized to improve the performance of the pigments dispersed with these dispersants. For instance, monomers may be chosen for the polymeric dispersants to improve pigmented paint performance. For inkjet inks with polymerically dispersed pigments, monomers may be chosen to optimize the print performance of inkjet inks.

U.S. patent application publication Nos. 20080264298 and 20070100023 disclose dispersants capable of interacting with calcium components present in many types of paper.

There has been effort in the art directed at improving color saturation of images from inkjet printing. As the inkjet industry moves to page-wide array printing, the requirements for repeating jetting cycles may be an order of magnitude higher than the traditional Small Office/Home Office market. These and other emerging needs require inks with improved color saturation. The present disclosure satisfies this need by providing pigment dispersions based on polymeric dispersants having functionalities capable of interacting with cellulose.

SUMMARY OF THE DISCLOSURE

An embodiment provides an aqueous pigment dispersion comprising a dispersed pigment, an aqueous carrier and a polymeric dispersant; wherein said polymeric dispersant is a random or structured polymer and comprising at least three monomers A, B and C; wherein monomer A is a hydrophobic acrylate monomer, monomer B is a hydrophilic acrylic monomer, and monomer C is an acrylate monomer with the O atom on the ester bonding, either directly or via a linking group containing 1-10 carbon atoms, to a carbon or heteroatom of a monocylic or bicyclic heterocycle containing N, S or O atoms on the ring, wherein said heterocycle is selected from the group consisting of imidazole, imidazolidinone, oxazolidinone, thiazolidinone, benzotriazole, benzimidazole, triazole, benzotriazole, thiazole, benzothiazole, pyrimidine, pyridazine and glycoside, and wherein the carbon atoms on the ring of said heterocycle are optionally substituted with one or more $R^1$, $OR^2$, $SR^2$ or $NR^3R^4$, and the N atom or atoms on the ring of said heterocycle are optionally substituted with $R^1$ or —$R^5OR^2$;

each $R^1$ is independently $C_1$-$C_{20}$ alkyl, $C_3$-$C_{20}$ cycloalkyl or $C_6$-$C_{40}$ aryl;

each $R^2$ is independently H, $C_1$-$C_{20}$ alkyl, $C_3$-$C_{20}$ cycloalkyl or $C_6$-$C_{40}$ aryl; and each $R^3$ and $R^4$ are independently H, $C_1$-$C_{20}$ alkyl, $C_3$-$C_{20}$ cycloalkyl or $C_6$-$C_{40}$ aryl; and each $R^5$ is $C_1$-$C_5$ alkyl.

Another embodiment provides that the polymeric dispersant has between 10 to 80 weight % of monomer A, between 5 to 50 weight % of monomer B and between 5 to 50 weight % of monomer C.

Another embodiment provides that the polymeric dispersant is substituted with one or more crosslinkable moieties, and said crosslinkable moieties are selected from the group consisting of acetoacetoxy, acid, amine, epoxy, hydroxyl, blocked isocyanates, and mixtures thereof.

Another embodiment provides that the polymeric dispersant with substituted crosslinkable moieties is reacted with a crosslinking agent, and wherein said crosslinking agent is selected from a group consisting of acetoacetoxy, acid, amine, anhydride, epoxy, hydroxyl, isocyanates, blocked isocyanates and mixtures thereof.

Another embodiment provides that the heterocycle is imidazole.

Another embodiment provides that the heterocycle is imidazolidinone.

Another embodiment provides that the heterocycle is oxazolidinone.

Another embodiment provides that the heterocycle is thiazolidinone.

Another embodiment provides that the heterocycle is benzotriazole and benzimidazole.

Another embodiment provides that the heterocycle is benzimidazole.

Another embodiment provides that the heterocycle is triazole.

Another embodiment provides that the heterocycle is benzotriazole.

Another embodiment provides that heterocycle is thiazole.

Another embodiment provides that the heterocycle is benzothiazole.

Another embodiment provides that the heterocycle is pyrimidine.

Another embodiment provides that the heterocycle is pyridazine.

Yet another embodiment provides that the heterocycle is glycoside.

These and other features and advantages of the present embodiments will be more readily understood by those of ordinary skill in the art from a reading of the following Detailed Description. Certain features of the disclosed embodiments which are, for clarity, described above and below as separate embodiments, may also be provided in combination in a single embodiment. Conversely, various features of the disclosed embodiments that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this disclosure pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

Unless it is otherwise stated or clear from the context, when discussing properties or components of an inkjet ink, the term "inkjet ink" may be understood to include inkjet ink sets.

When the term "about" is used in describing a value or an end-point of a range, the disclosure should be understood to include the specific value or end-point referred to.

As used herein, "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples encompassed by the terms "consisting essentially of" and "consisting of." Similarly, the term "consisting essentially of" is intended to include examples encompassed by the term "consisting of."

As used herein, the term "dispersion" means a two phase system where one phase consists of finely divided particles (often in the colloidal size range) distributed throughout a bulk substance, the particles being the dispersed or internal phase and the bulk substance the continuous or external phase. The bulk system is often an aqueous system.

As used herein, the term "dispersion of pigment particles" is a stable dispersion of polymeric dispersed pigments which are normally used in inks and paints.

As used herein, the term "aqueous pigment dispersion" is an aqueous dispersion of pigments using polymeric dispersants.

As used herein, the term "paper" means a semisynthetic product made by chemical processing of cellulosic fibers. The term paper also refers to the variety of paper used in printing such as copy paper, photo paper, newsprint, brochure paper and the like.

As used herein, the term "solubility parameter" provides a numerical estimate of the degree of interaction between materials, and can be a good indication of solubility, particularly for non-polar materials such as many polymers.

As used herein, the term "dispersant" means a surface active agent added to a suspending medium to promote uniform and maximum separation of extremely fine solid particles often of colloidal size. For pigments, the dispersants are most often polymeric dispersants and usually the dispersants and pigments are combined using dispersing equipment.

As used herein, the term "structured polymer" means a polymer that is composed of segments that differ in composition from each other. Examples include diblock, triblock, graft and star polymers.

As used herein, the term "random polymer" means a polymer that is composed of monomers distributed in a random fashion in the polymer in much the same mole ratio of the monomers in the initial monomer composition.

As used herein, the term "ionically stabilized dispersions", ("ISD") are polymerically stabilized dispersions where the stabilization is due to ionic stabilization with little or no steric stabilization.

As used herein, the term "dispersible particles" are those particles that can be dispersed with dispersants including polymeric dispersants.

As used herein, the term "stable dispersion" means a dispersion of particles where the particle size growth is less than 10% particle size growth and no flocculation when the dispersion is stored at room temperature for at least a week.

As used herein, the term "pigment" means any substance usually in a powder form which imparts color to another substance or mixture. Disperse dyes, white and black pigments are included in this definition.

As used herein, the term "P/D" means the pigment to dispersant weight ratio in the initial dispersion formulation.

As used herein, the term "ambient conditions" refers to surrounding conditions, which are often around one atmosphere of pressure, about 50% relative humidity, and about 25° C.

As used herein, the term "crosslinking" means the chemical reaction between reactive groups on at least two different chemicals, where one of the chemicals is at least disubstituted.

As used herein, the term "heterocycle" means acyclic ring compound which consists of carbon atoms and at least one N, O, or S in the ring and contains 4-7 total atoms in ring. The carbon atom(s) on the ring may optionally form carbonyl group(s).

As used herein, the term "binder" means a film forming ingredient in the inkjet ink. This binder is normally added when the ink is formulated.

As used herein, the term "HSD" means High Speed Dispersing.

As used herein, the term "OD" means optical density.

As used herein, the term "color saturation" is defined as chroma normalized by lightness L*, in the CIELAB color space; this is:

$$s_{ab} = \frac{C^*_{ab}}{L^*}$$

where CIE is the International Commission on Illumination.

As used herein, the term "Gloss" means observation of reflected light from a printed surface, normally the printed substrate is glossy paper.

As used herein, the term "SDP" means "self-dispersible", "self-dispersing" or "self-dispersed" pigment.

As used herein, the term "aqueous vehicle" refers to water or a mixture of water and at least one water-soluble organic solvent (co-solvent).

As used herein, the term "ionizable groups", means potentially ionic groups.

As used herein, the term "substantially" means being of considerable degree, almost all.

As used herein, the term "Mn" means number average molecular weight usually reported in daltons.

As used herein, the term "Mw" means weight average molecular weight usually reported in daltons.

As used herein, the term "Pd" means the polydispersity which is the weight average molecular weight divided by the number average molecular weight.

As used herein, the term "D50" means the particle size at which 50% of the particles are smaller; "D95" means the particle size at which 95% of the particles are smaller.

As used herein, the term "cP" means centipoise, a viscosity unit.

As used herein, the term "conductivity" means the property of a substance or mixture that describes its ability to transfer electricity and is reported as mS/cm.

As used herein, the term "pre-polymer" means the polymer that is an intermediate in a polymerization process, and can also be considered a polymer.

As used herein, the term "AN" means acid number, mg KOH/gram of solid polymer.

As used herein, the term "neutralizing agents" means to embrace all types of agents that are useful for converting ionizable groups to the more hydrophilic ionic (salt) groups.

As used herein, the term "PUD" means the polyurethane dispersions described herein.

As used herein, the term "GPC" means gel permeation chromatography.

As used herein, the term "THF" means tetrahydrofuran.

As used, herein, the term "IMEMA" refers to imidazolylethyl methacrylate, a monomer from BASF.

As used herein, the term "DMPA" means dimethylol propionic acid.

As used herein, the term "TMXDI" means tetramethyl xylylene diisocyanate.

As used herein, Eternacoll® UH-50 is a polycarbonate diol from UBE industries, Tokyo, Japan.

Denacol® 321 is trimethylolpropane polyglycidyl ether, a cross-linking reagent from Nagase Chemicals Ltd., Osaka, Japan.

As used herein, the term "DEA" means diethanolamine.

As used herein, the term "PROXEL™ biocide" refers to a biocide obtained from Arch Chemicals, Norwalk, Conn.

As used herein, the term "Surfynol 465" refers to surfactant from Air Products (Allentown, Pa. USA).

As used herein, the term "Glycereth-26" refers to a 26 mole ethylene oxide adduct of glycerin.

As used herein, the term "2-P (95/5)" means 2-Pyrrolidone supplied as a 5% water mixture.

Unless otherwise noted, the above chemicals were obtained from Aldrich (Milwaukee, Wis.) or other similar suppliers of laboratory chemicals.

Polymeric Dispersant

The science and art of producing stable dispersions utilizing organic polymeric dispersants has been studied and extensively developed. Different types of dispersants are characterized based on the perceived mechanism(s) of stabilization. Furthermore, dispersants may be employed to optimize end properties of the dispersed particle. In the case of inkjet inks, certain modification of dispersants can lead to better print performance without loss of the stability of the inkjet inks.

A model for effective use of pigments in inkjet inks is that a pigment is held onto the surface of a substrate resulting high optical density and other desirable print properties. Examples of "holding" the pigment onto the surface include using a fixing agent that reacts or effects the pigment when it is jetted onto the substrate, using self-dispersing pigment, using dispersants that are designed to interact with calcium as suggested in US20080264298 and US200070100023, etc. Calcium carbonate is often a component of paper, especially for copy paper and similar papers used for inkjet printing.

While seeking new ways to obtain high OD and achieve high saturation printed images from inkjet inks, a set of monomers was identified as capable of interacting with cellulose which is the predominant component in paper. These monomers were selected by matching their Hansen solubility parameters with that of cellulose. Inclusion of these monomers in a polymerization process provides the polymeric dispersants of the present disclosure. While not being bound by theory, it is concluded that if a dispersant contains monomers that can interact with cellulose, the resulting inkjet inks will behave differently. Upon jetting on paper, the dispersant can interact with the paper, leaving the pigment to be fixed at or near the top of the paper to optimize print optical densities and color saturation.

Accordingly, polymeric dispersants having heterocyclic substituents capable of interacting with cellulose were prepared. The polymeric dispersant comprises at least three monomers A, B and C; where
  a) monomer A is a hydrophobic acrylate monomer,
  b) monomer B is a hydrophilic acrylic monomer,
  c) monomer C monomer C is a vinyl or an acrylate monomer with the O atom on the ester bonding, either directly or via a linking group containing 1-10 carbon atoms, to a carbon or heteroatom of a monocylic or bicyclic heterocycle containing N, S or O atoms on the ring, wherein said heterocycle is selected from the group consisting of imidazole, imidazolidinone, oxazolidinone, thiazolidinone, benzotriazole, benzimidazole, triazole, benzotriazole, thiazole, benzothiazole, pyrimidine, pyridazine and glycoside, wherein the carbon atoms on the ring of said heterocycle are optionally substituted with one or more $R^1$, $OR^2$, $SR^2$ or $NR^3R^4$, and the N atom or atoms on the ring of said heterocycle are optionally substituted with $R^1$ or $—R^5OR^2$;
  each $R^1$ is independently $C_1$-$C_{20}$ alkyl, $C_3$-$C_{20}$ cycloalkyl or $C_6$-$C_{40}$ aryl;
  each $R^2$ is independently H, alkyl, $C_1$-$C_{20}$ alkyl, $C_3$-$C_{20}$ cycloalkyl or $C_6$-$C_{40}$ aryl; and
  each $R^3$ and $R^4$ are independently H, $C_1$-$C_{20}$ alkyl, $C_3$-$C_{20}$ cycloalkyl or $C_6$-$C_{40}$ aryl;
  and each $R^5$ is $C_1$-$C_5$ alkyl.

The amounts of the monomers are between 10 to 80% of monomer A, between 5 to 50% of monomer B, and between 5 to 50% of monomer C.

The polymeric dispersant of the present disclosure has a number average molecular weight of 2000 to 30000 daltons.

The hydrophilic acrylic monomer provides ionic content for the polymeric dispersant. The amount of acid content may be measured as an acid number (AN, mg KOH per gram solid polymer). The lower limit for acid number is about 10, and the upper limit for the acid number is about 250.

The polymeric dispersant may be either a random or structured polymer. The polymer dispersant can be a copolymer of hydrophobic (monomer A), hydrophilic (monomer B) monomers and the heterocycle containing acrylate monomer C.

The structured polymeric dispersant may be water soluble and may have a solubility of at least 10 grams of polymer/100 grams of water at 25° C. The solubility is measured in its neutralized form.

A subset of the random and structured polymer dispersants are ionically stabilized dispersants where the stabilization by the dispersant is ionic with little or no steric stabilization. These ionic polymeric dispersants were described in US Patent Application Publication No. 20050090599.

The term "random polymer" means polymers where molecules of each monomer are randomly arranged in the polymer backbone. For a reference on suitable random polymeric dispersants, see: U.S. Pat. No. 4,597,794. The term "structured polymer" means polymers having a block, branched, graft or star structure. Examples of structured polymers include AB or BAB block copolymers such as the ones disclosed in U.S. Pat. No. 5,085,698; ABC block copolymers such as the ones disclosed in EP Patent Specification No. 0556649; and graft polymers such as the ones disclosed in U.S. Pat. No. 5,231,131. Other polymeric dispersants that can be used are described, for example, in U.S. Pat. Nos. 6,117,921, 6,262,152, 6,306,994 and 6,433,117.

Polymer dispersants suitable for use in the present invention generally comprise both hydrophobic, hydrophilic monomers and monomers substituted with the heterocycles listed above. Some examples of hydrophobic monomers used in random polymers are methyl methacrylate, n-butyl methacrylate, 2-ethylhexyl methacrylate, benzyl methacrylate, 2-phenylethyl methacrylate and the corresponding acrylates. Examples of hydrophilic monomers are methacrylic acid, acrylic acid, dimethylaminoethyl(meth)acrylate and salts thereof. Also quaternary salts of dimethylaminoethyl(meth)acrylate may be employed.

Generally speaking the hydrophobic region is the part that contains the absorbing segment, which is the segment or function of the dispersant interacting with the pigment surface to effect dispersion. The hydrophilic segment is the segment that provides the stability of dispersion by interaction in the solute mixture to provide stabilization. This stabilization is characterized as steric stabilization or ionic stabilization. These phenomena were described by H. Spinelli in Adv. Mater, 1998, 10, no. 15, page 1215 to 1218. The ionically stabilized polymeric dispersants described above have little if any steric stabilization.

The polymeric dispersant can be neutralized prior to the start of the dispersion process. That is, the initial mixture of solvent blend and polymer dispersant has an appropriate amount of neutralizing agent. Alternatively, the neutralizing agent may be added with the polar solvent during the dispersing process. An additional option is to have the polymeric dispersant partially neutralized in the initial mixture and add additional neutralizing agent in the polar solvent. The amount of neutralization of the polymeric, dispersant in the final mixture is up to about 100% neutralized, and preferably up to about 90% neutralized.

The neutralizing agent can be hydroxides of the alkali metals, amines and the like. Examples of neutralizing agents include organic bases such as mono-, di, tri-methylamine, morpholine, n-methyl morpholine; alcohol amines such as dimethylethanolamine (DMEA), methyldiethanolamine, mono-, di, and tri-ethanolamine, pyridine; ammonium hydroxide; tetra-alkylammonium salts such as tetramethylammonium hydroxide, tetraethyl-ammonium hydroxide; alkali metals such as lithium, sodium and potassium, and the like. Preferred neutralizing agents include dimethylethanolamine and sodium and potassium hydroxides, with potassium hydroxide being particularly preferred for inks to be used in thermal inkjet printers.

Pigments

Pigments suitable for use in the present invention are those generally well known in the art for aqueous inkjet inks. Representative commercial dry pigments are listed in U.S. Pat. No. 5,085,698. Dispersed dyes are also considered pigments as they are insoluble in the aqueous inks used herein.

A wide variety of organic and inorganic pigments, alone or in combination, may be selected to make the ink. The term "pigment" as used herein means an insoluble colorant which includes dispersed dyes as they are insoluble in the inkjet ink. The pigment particles are sufficiently small to permit free flow of the ink through the inkjet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is typically about 0.005 micron to about 15 micron, and in embodiments, the pigment particle size ranges from about 0.005 to about 5 micron, and in embodiments, from about 0.005 to about 1 micron. The average particle size as measured by dynamic light scattering is preferably less than about 500 nm, more preferably less than about 300 nm.

The selected pigment(s) may be used in dry or wet form. For example, pigments are usually manufactured in aqueous media and the resulting pigment is obtained as water-wet presscake. In presscake form, the pigment is not agglomerated to the extent that it is in dry form. Thus, pigments in water-wet presscake form do not require as much deflocculation in the process of preparing the inks as pigments in dry form.

The dispersed pigment may be purified after the dispersion process by filtration, ultrafiltration or other processes used for purification of dispersed pigments.

Dispersion of the Pigment Particles

The dispersing step for the polymerically dispersed pigment may be accomplished in an ultrasonicator, media mill, a horizontal mini mill, an attritor, or by passing the mixture through a plurality of nozzles within a liquid jet interaction chamber at a liquid pressure of at least 5,000 psi to produce a uniform dispersion of the pigment particles in the aqueous carrier medium (microfluidizer). The media for the media mill is chosen from commonly available media, including zirconia, YTZ, and nylon. The media can be as small as about 0.1 microns, although particles larger than 0.3 microns are commonly used. These various dispersion processes are in a general sense well known in the art, as exemplified by U.S. Pat. Nos. 5,022,592, 5,026,427, 5,891,231, 5,679,138, 5,976,232 and US Patent Application Publication No. 20030089277. Preferred are media mill, and by-passing the mixture through a plurality of nozzles within a liquid jet interaction chamber at a liquid pressure of at least 5,000 psi. The mixing intensity required for the process is mixing normally associated with dispersion processes and not turbulent mixing of more modest mixing processes.

Combinations of dispersing equipment may be used. It may be more convenient to mix the solvent mixture, particle and polymeric dispersant in a High Speed Disperser (HSD) followed by milling in a media mill or a microfluidizer. The addition of the polar solvent may occur during the HSD portion of the processing and then the milling is continued in the media mill.

The final use of the particle dispersion may require that the solvent be removed from the particle dispersion mixture. The solvent may be removed by distillation processing, ultrafiltration or other convenient means. Any of these solvent removal methods may be incorporated into the process. The dispersing equipment and the solvent removal may be coupled and the solvent may be removed during the dispersing process and during the addition of the polar solvent.

One way to monitor the progress of the dispersion process is to measure the particle size and set a target value for the final D50 of the mixture. For typical pigments used for ink-jet inks the target value of the D50 is 125 nm or less, preferably less than 100 nm. Also the D95 and the particles smaller than 204 nm can be used as a test criterion for the pigment dispersions.

A wide variety of organic and inorganic pigments, alone or in combination, may be selected for dispersion by this process. The dispersed pigment may be used in paints, inks and especially inkjet inks. The term "pigment" as used herein means an insoluble colorant and in the present application includes disperse dyes. The pigment particles are sufficiently small to permit free flow of the ink through the inkjet printing device, especially at the ejecting nozzles that usually have a diameter ranging from about 10 micron to about 50 micron.

The particle size also has an influence on the pigment dispersion stability, which is critical throughout the life of the ink. Brownian motion of minute particles will help prevent the particles from flocculation. It is also desirable to use small particles for maximum color strength and gloss.

The dispersed pigment may be purified after the dispersion process by filtration, ultrafiltration or other processes used for purification of dispersed pigments.

Crosslinked Polymeric Dispersant

The polymeric dispersant may be crosslinked after the pigment dispersion is prepared.

Polymeric dispersants substituted with crosslinkable moieties including acetoacetoxy, acid, amine, epoxy, hydroxyl, blocked isocyanates and mixtures are capable of undergoing crosslinking. Typically, a crosslinking agent is added to effect crosslinking. Typical crosslinking agents include acetoacetoxy, acid, amine, anhydride, epoxy, hydroxyl, isocyanates, blocked isocyanates, and mixtures thereof. The crosslinking of the polymeric dispersant is typically conducted after the pigment is dispersed. After the crosslinking step, excess polymeric dispersant can be removed by purification processes such as ultrafiltration.

Specific examples of crosslinking moiety/agent pairs are hydroxyl/isocyanate and acid/epoxy.

The product of this crosslinking process is a stable, dispersed pigment. This stable pigment dispersion is one that has less than 10% particle size growth and no flocculation when the dispersion is stored at room temperature for at least a week. More rigorous testing that entails accelerated testing by heating samples for a week or more can also be used to determine the stability of the particle dispersions. The optimal particle dispersion stability would depend on the dispersion's characteristics and/or final use. Another criterion for a stable dispersed particle is that it can be processed under normal dispersing process conditions, without turning into a gel or having other adverse properties.

Amounts/Ratios of the Ingredients

For inkjet inks, the mass ratio of pigment to polymeric dispersant ranges from 0.33 to 400. This ratio is based on the mass of the pigment and that of the polymeric dispersant added to the dispersion. For organic pigments the ratio is 0.33 to 12, optionally 0.5 to 10. For inorganic pigments the ratio is 3 to 400, optionally 5 to 200.

In the case of organic pigments, the inkjet ink may contain up to approximately 30% of the pigment, optionally 0.11 to 25%, and further from 0.25 to 15% pigment by weight based on the total ink weight of the ink. If an inorganic pigment is selected, the ink will tend to contain higher weight percentages of pigment than with comparable inks employing organic pigment, and the ink may be as high as 75% in some cases, since inorganic pigments generally have higher specific gravities than organic pigments. Examples of inorganic pigments include titanium dioxide, iron oxides, and the like.

Aqueous Carrier Medium

The aqueous carrier medium (aqueous vehicle) for the inkjet inks which utilize the encapsulated pigment described above is water or a mixture of water and at least one water-miscible organic solvent. Selection of a suitable mixture depends on requirements of the specific application, such as desired surface tension and viscosity, the selected pigment, drying time of the pigmented inkjet ink, and the type of paper onto which the ink will be printed. Representative examples of water-soluble organic solvents that may be selected include (1) alcohols, such as methyl alcohol, ethyl alcohol, n-propyl alcohol, iso-propyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thiodiglycol; (6) lower alkyl mono- or di-ethers derived from alkylene glycols, such as ethylene glycol mono-methyl (or -ethyl) ether, diethylene glycol mono-methyl (or -ethyl) ether, propylene glycol mono-methyl (or -ethyl) ether, triethylene glycol mono-methyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

A mixture of water and a polyhydric alcohol, such as diethylene glycol, is preferred as the aqueous carrier medium. In the case of a mixture of water and diethylene glycol, the aqueous carrier medium usually contains from 30% water/70% diethylene glycol to 95% water/5% diethylene glycol. The preferred ratios are approximately 60% water/40% diethylene glycol to 95% water/5% diethylene glycol. Percentages are based on the total weight of the aqueous carrier medium. A mixture of water and butyl carbitol is also an effective aqueous carrier medium.

The amount of aqueous carrier medium in the ink is typically in the range of 70% to 99.8%, and preferably 80% to 99.8%, based on total weight of the ink.

The aqueous carrier medium can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, propylene glycol mono-n-butyl ether, dipropylene glycol mono-n-propyl ether, and dipropylene glycol mono-iso-propyl ether. 1,2-Alkanediols are preferably 1,2-C4-6 alkanediols, most preferably 1,2-hexanediol. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont).

The amount of glycol ether(s) and 1,2-alkanediol(s) added must be properly determined, but is typically in the range of from 1 to 15% by weight and more typically 2 to 10% by weight, based on the total weight of the ink. Surfactants may be used, typically in the amount of 0.01 to 5% and preferably 0.2 to 4%, based on the total weight of the ink.

Other Additives

Other ingredients, additives, may be formulated into the inkjet ink, to the extent that such other ingredients do not interfere with the stability and jettability of the inkjet ink. This may be readily determined by routine experimentation by one skilled in the art.

Surfactants are commonly added to inks to adjust surface tension and wetting properties. Suitable surfactants include the ones disclosed in the Vehicle section above. Surfactants are typically used in amounts up to about 5% and more typically in amounts up to 2% by weight, based on the total weight of the ink.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DREG), trans-1,2-cyclohexanediaminetetraacetic acid (CyDTA), diethylenetriamine-N,N,N',N",N"-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Polymers may be added to the ink to improve durability or other properties. The polymers can be soluble in the vehicle or in a dispersed form, and can be ionic or nonionic. Soluble polymers include linear homopolymers and copolymers or block polymers. They also can be structured polymers including graft or branched polymers, stars and dendrimers. The dispersed polymers may include, for example, latexes and hydrosols. The polymers may be made by any known process including, but not limited to, free radical, group transfer, ionic, condensation and other types of polymerization. They may be made by a solution, emulsion, or suspension polymerization process. Typical classes of polymer additives include anionic acrylic, styrene-acrylic and polyurethane polymer.

When a polymer is present, its level is typically between about 0.01% and about 3% by weight, based on the total weight of an ink. The upper limit is dictated by ink viscosity or other physical limitations.

Ink Sets

The term "ink set" refers to all the individual inks or other fluids an inkjet printer is equipped to jet. Ink sets typically comprise at least three differently colored inks. For example, a cyan (C), magenta (M) and yellow (Y) ink forms a CMY ink set. More typically, an ink set includes at least four differently colored inks, for example, by adding a black (K) ink to the CMY ink set to form a CMYK ink set. The magenta, yellow and cyan inks of the ink set are typically aqueous inks, and may contain dyes, pigments or combinations thereof as the colorant. Such other inks are, in a general sense, well known to those of ordinary skill in the art.

In addition to the typical CMYK inks, an ink set may further comprise one or more "gamut-expanding" inks, including differently colored inks such as an orange ink, a green ink, a red ink and/or a blue ink, and combinations of full strength and light strength inks such as light cyan and light magenta. Such other inks are, in a general sense, known to one skilled in the art.

A typical ink set comprises a magenta, yellow, cyan and black ink, wherein the black ink is an ink according to the present disclosure comprising an aqueous vehicle and a self-dispersing carbon black pigment. Specifically, the colorant in each of the magenta, yellow and cyan inks is a dye.

Ink Properties

Jet velocity, separation length of the droplets, drop size and stream stability are greatly affected by the surface tension and the viscosity of the ink. Pigmented ink jet inks typically have a surface tension in the range of about 20 dyne/cm to about 70 dyne/cm at 25° C. Viscosity can be as high as 30 cP at 25° C., but is typically somewhat lower. The ink has physical properties compatible with a wide range of ejecting conditions, i.e., driving frequency of the piezo element or ejection conditions for a thermal head for either a drop-on-demand device or a continuous device, and the shape and size of the nozzle.

The inks should have excellent storage stability for long periods so as not to clog to a significant extent in an ink jet apparatus. Furthermore, the ink should not corrode parts of the ink jet printing device it comes in contact with, and it should be essentially odorless and non-toxic.

Although not restricted to any particular viscosity range or printhead, the inventive ink set is particularly suited to lower viscosity applications such as those required by thermal printheads. Thus the viscosity of the inventive inks at 25° C., can be less than about 7 cP, typically less than about 5 cP, and more typically than about 3.5 cP. Thermal inkjet actuators rely on instantaneous heating/bubble formation to eject ink drops and this mechanism of drop formation generally requires inks of lower viscosity.

Substrate

The present embodiments are particularly advantageous for printing on plain paper, such as common electrophotographic copier paper and photo paper, glossy paper and similar papers used in inkjet printers.

EXAMPLES

The following examples illustrate various embodiments of the present disclosure without, however, being limited thereto. Tests listed here are those that are commonly used for testing pigment dispersions and inkjet inks.

The particle size for the pigment dispersions and the inks were determined by dynamic light scattering using a MICROTRAC UPA 150 analyzer from Honeywell/Microtrac (Montgomeryville Pa.).

This technique is based on the relationship between the velocity distribution of the particles and the particle size. Laser generated light is scattered from each particle and is Doppler shifted by the particle Brownian motion. The frequency difference between the shifted light and the unshifted light is amplified, digitalized and analyzed to recover the particle size distribution. Results are reported as D50 and D95 and particles less than 204 nm.

MW Characterization of the Polymeric Dispersants

Gel Permeation Chromatography or GPC was used to verify predicted molecular weight and molecular weight distribution. The GPC system included a Waters 1515 Isocratic HPLC Pump, Waters 2414 Refractive Index Detector, 717 plus Waters Autosampler, Four Styregel Columns (HR 0.5, HR 1, HR 2, and HR 4) in series in a Waters Column Heater set to 40° C. Samples were eluted with Tetrahydrofuran (THF) at a flow rate of 1 mL/min. The samples were analyzed using Breeze 3.30 Software with a calibration curve developed from narrow molecular weight, polymethylmethacrylate (PMMA) standards. Based on light scattering data from Polymer Laboratories Ltd., the nominal, peak molecular weight for the PMMA standards were as follows: 300000, 150000, 60000, 30000, 13000, 6000, 2000, and 1000.

The inks were tested by printing on various substrates with HP and Epson printers. Plain paper, glossy paper and brochure paper were tested.

The optical density was measured using a Greytag-Macbeth SpectroEye™ instrument (Greytag-Macbeth AG, Regensdorf, Switzerland).

The durability of the image towards highlighter smear was done using a Faber-Castel highlighter pen after the printed image was allowed to dry for one hour after printing. The image was marked twice, the first mark was with a single pass with the highlighter and the second mark was with two passes with the highlighter. These highlighter marks were tested by measuring the optical density in the region on the smear adjacent to the printed image. The optical density is corrected for a highlighter that is not drawn across the printed image. That is, after the highlighter is drawn across the printed marks the OD is measured in the yellow highlighted area adjacent to the printed marks. In this area will be the highlighter and the transferred pigment. The amount of optical density measured is an indication of how much of the printed image is smeared and a higher number demonstrates a worse result. This smear is reported in milliOD units.

Dispersant 1: Diblock 30BzMA/9MAA//4IMEMA

A 2-liter round bottom flask was dried with a heat gun under nitrogen purge and equipped with a mechanical stirrer, thermocouple, $N_2$ inlet, drying tube outlet, and addition funnels. Tetrahydrofuran (THF), 390 g, was cannulated to the flask. Initiator (1,1-bis(trimethylsilyloxy)-2-methyl propene, 16.99 g (73.2 mmoles)) was injected followed by catalyst (tetrabutyl ammonium m-chlorobenzoate, 0.4 ml of a 1.0 M solution in acetonitrile). Catalyst solution (tetrabutyl ammonium m-chlorobenzoate, 0.4 ml of a 1.0 M solution in acetonitrile and THF, 1.5 g) was syringe pumped during both the monomer feeds. Monomer feed 1 (trimethylsilyl methacrylate 104.1. g (0.788 mol) and benzyl methacrylate, 388.6 g (2.208 mol)) was added over 65 minutes while the reaction exothermed to 65.3° C. After a 1.5 hr hold, HPLC indicated greater than 95% monomer conversion, and then, monomer feed II imidazolylethyl methacrylate, 52.8 g (0.293 mol)) was added over 20 minutes.

The IMEMA conversion was greater than 99% 180 min after the feed was complete. To the mixture were added 46.9 g of methanol. THF and other volatile by-products were then distillated off by slowly heating to 120° C. while adding 2-P (95/5). The final polymer solution contained 41.51% of solids with a measured acid number of 87.6 mg KOH/gram of polymer solids. The molecular weight of this polymer as measured by GPC was Mn 5880, Mw 6925, and PD 1.18.

Dispersant 2: Random 70% BzMA20% MMA10% IMEMA

A 2-liter round bottom flask was purged nitrogen purge and equipped with a mechanical stirrer, thermocouple, $N_2$ inlet, drying tube outlet, and addition funnels. The reactor was charged with 151.7 g 2-P (95/5) and 45.5 g isopropanol, and was heated to reflux at 110° C. An addition funnel for monomers was charged with 218.4 g benzyl methacrylate, 31.2 g imidazolylethyl methacrylate, and 62.4 g Methacrylic acid, and a second addition funnel for initiator was charged with 12.5 g 4,4'-Azobis(4-Cyanovaleric Acid) and 356.6 g 2-P (95/5). The initiator and monomer mixtures were feed in to the reactor concurrently over 240 minutes. Reflux was maintained in the reactor with the temperature starting at 110° C. and increasing to 132° C. After 15 minutes, additional initiator (1.17 g 4,4'-Azobis(4-Cyanovaleric Acid) and 40.3 g 2-P (95/5)) was added over 21 minutes, and reflux was maintained for 1 hr. The content of solids was adjusted by the addition of 121.7 g 2-P (95/5). The final polymer solution contained 35.66% of solids with a measured acid number of 133.0 mg KOH/gram of polymer solids. The molecular weight of this polymer as measured by GPC was Mn 8706 and PD 1.96.

Dispersant 3: Random 70% BzMA20% MMA10% GlyA

A 2-liter round bottom flask was purged nitrogen purge and equipped with a mechanical stirrer, thermocouple, N7 inlet, drying tube outlet, and addition funnels. The reactor was charged with 134.6 g 2-P (95/5), 40.4 g isopropanol, and 92.2 g glycosidyl acrylate (GlyA), and was heated to reflux at 98° C. An addition funnel for monomers was charged with 194.2 g benzyl methacrylate, and 55.5 g Methacrylic acid, and a second addition funnel for initiator was charged with 11.1 g 4,4'-Azobis(4-Cyanovaleric Acid) and 316.1 g 2-P (95/5). Removed 26.3 g monomer mix from feed and added to reactor. The initiator and remaining monomer were feed in to the reactor concurrently over 240 minutes. Reflux was maintained in the reactor with the temperature starting at 97.5° C. and increasing to 115° C. After 76 minutes, additional initiator (1.7 g 4,4'-Azobis(4-Cyanovaleric Acid) and 47.4 g 2-P (95/5)) was added over 15 minutes, and reflux was maintained for 1 hr. Solids were adjusted with the addition of 115.8 g 2-P (95/5). The final polymer solution was 29.68% solids with a measured number of 145.75 mg KOH/gram of polymer solids.

Dispersant 4: Random 70% BzMA20% MMA30% IMEMA

A 2-liter round bottom flask was purged nitrogen purge and equipped with a mechanical stirrer, thermocouple, $N_2$ inlet, drying tube outlet, and addition funnels. The reactor was charged with 144.1 g 2-P (95/5) and 45.1 g isopropanol, and then, heated to reflux, 110° C. An addition funnel for monomers was charged with 148.4 g benzyl methacrylate, 88.7 g imidazolylethyl methacrylate, and 60.0 g Methacrylic acid, and a second addition funnel for initiator was charged with 12.0 g 4,4'-Azobis(4-Cyanovaleric Acid) and 329.5 g 2-P (95/5). The initiator and monomer mixtures were feed in to the reactor concurrently over 240 minutes. Reflux was maintained in the reactor with the temperature starting at 112° C. and increasing to 131° C. After 20 minutes, additional initiator (2.0 g 4,4'-Azobis(4-Cyanovaleric Acid) and 51.0 g 2-P (95/5)) was added over 15 minutes, and reflux was maintained for 1 hr. Solids was adjusted with the addition of 115.8 g 2-P (95/5). The final polymer solution contained 35.45% of solids with a measured acid number of 154.78 mg KOH/gram of polymer solids.

Dispersant 5: Random 70% BzMA20% MMA30% GlyA (E117215-56)

A 2-liter round bottom flask was purged nitrogen purge and equipped with a mechanical stirrer, thermocouple, $N_2$ inlet, drying tube outlet, and addition funnels. The reactor was charged with 120.7 g 2-P (95/5), 35.8 g isopropanol, and 246.2 g lycosidacrylate then, heated to reflux, 91° C. An addition funnel for monomers was charged with 123.2 g benzyl methacrylate, and 49.3 g Methacrylic acid, and a second addition funnel for initiator was charged with 10.3 g 4,4'-Azobis(4-Cyanovaleric Acid) and 380.1 g 2-P (95/5). Removed 17.3 g monomer mix from feed and added to reactor. The initiator and remaining monomer were feed in to the reactor concurrently over 240 minutes. Reflux was maintained in the reactor with the temperature starting at 107° C. and increasing to 122° C. After 70 minutes, additional initiator (1.8 g 4,4'-Azobis(4-Cyanovaleric Acid) and 42.9 g 2-P (95/5)) was added over 35 minutes, and reflux was maintained for 1 hr. Solids was adjusted with the addition of 304.2 g 2-P (95/5). The final polymer solution was 23.61% solids with a measured number of 198.45 mg KOH/gram of polymer solids.

The properties of polymeric dispersants 1-5 are listed in Table 1 below.

TABLE 1

| Example # | Structure | GPC Mn | GPC PD | Solids | Acid value | Acid Number |
|---|---|---|---|---|---|---|
| Dispersant 1 | BZMA/ MAA//ImEMA 30/9//4 | 5880 | 1.18 | 41.51% | 1.56 | 87.53 |
| Dispersant 2 | 70/10/20 BZMA/ ImEMA/MAA | 8706 | 1.96 | 35.66% | 2.37 | 132.98 |
| Dispersant 3 | BZMA/ GLYA/MAA 70/10/20 FR | 11242 | 2.28 | 29.68% | 2.6 | 145.89 |

TABLE 1-continued

| Example # | Structure | GPC Mn | GPC PD | Solids | Acid value | Acid Number |
|---|---|---|---|---|---|---|
| Dispersant 4 | 50/30/20 BZMA/ImEMA/MAA | 5489 | 1.29 | 35.45% | 2.76 | 154.86 |
| Dispersant 5 | BZMA/GLY/MAA 60/30/20 FR | 8842 | 1.78 | 23.61% | 3.54 | 198.63 |

The five dispersants were used to prepare 19 different dispersions of cyan, magenta and yellow pigments listed in Table 2 below.

Crosslinking Dispersions

Dispersion 8, Epoxy Crosslinking of Magenta Dispersion

A 1 L round bottom reactor was loaded with 260 g Ultrafiltered Magenta dispersion 3 (11.51% pigment, PR269, dispersed with Dispersant 4). After stirring for several minutes, 0.30 g Denacol 321 epoxy was added, and then the reaction mixture was heated to 80° C. for a total of 8 h. During this time, the acid number decreased from 1.018 to 0.676 mg KOH/g, and pH increased to 9.19.

Dispersion 15, Epoxy Crosslinking of Magenta Dispersion

A 1 L round bottom reactor was loaded with 300 g Ultrafiltered Magenta dispersion 10 (8.37% pigment, PR269, dispersed with Dispersant 4). After stirring for several minutes, 0.25 g Denacol 321 epoxy was added, and then the reaction mixture was heated to 80° C. for a total of 8 h. During this time, the acid number decreased from 2.411 to 0.535 mg KOH/g, and pH increased to 9.27.

TABLE 2

| Dispersion | Colorant | Dispersant | Dispersion Accu. (×10E7) | d50 | d95 | % < 204 |
|---|---|---|---|---|---|---|
| 1 | Cyan | 1 | 26 | 63.2 | 135.3 | 99.35 |
| 2 | Yellow | 1 | 25 | 83.4 | 166 | 98.56 |
| 3 | Magenta | 2 | 7 | 85.5 | 186.9 | 96.83 |
| 4 | Yellow | 2 | 37.53 | 93.4 | 193.8 | 95.97 |
| 5 | Magenta | 2 | n/a | 102.2 | 208.7 | 94.55 |
| 6 | Magenta | 2 | 2.49 | 100.3 | 174.9 | 98.52 |
| 7 | Cyan | 2 | 15 | 75.8 | 136.7 | 100 |
| 8 | Magenta | 2 | 12.8 | 101 | 195 | 96 |
| 9 | Yellow | 2 | 22 | 83.5 | 169.2 | 97.97 |
| 10 | Magenta | 4 | 13 | 106.8 | 201.1 | 95.5 |
| 11 | Magenta | 4 | 8.6 | 97.5 | 212.3 | 94.11 |
| 12 | Yellow | 4 | 39.77 | 100.5 | 191.5 | 96.6 |
| 13 | Cyan | 4 | 12.3 | 80.8 | 136.5 | 100 |
| 14 | Magenta | 4 | 14.22 | 107.7 | 209 | 94.5 |
| 15 | Magenta | 4 | 8.4 | 91 | 165 | 98.6 |
| 16 | Magenta | 4 | 26 | 132.3 | 228.7 | 90.82 |
| 17 | Cyan | 5 | 32 | 84.8 | 179 | 97.35 |
| 18 | Magenta | 5 | 25 | 138.6 | 360 | 74.56 |
| 19 | Yellow | 5 | 9 | 112.6 | 208.8 | 94.36 |

The cyan is a Pigment Blue 15-3 pigment and the yellow a Pigment Yellow 74 pigment. Three magenta pigments were used. Dispersions 3, 8, 10, 11, 15 and 18 utilized PR-269, Dispersion 16 utilized PR-184, and the remaining magenta dispersions utilized PR-122. The properties of these dispersions are summarized, in Table 3 below.

TABLE 3

| Colorant Dispersion | Colorant | Visc. cP | Cond mS | pH | Solids % | Surf Ten dyne/cm | Pig. % |
|---|---|---|---|---|---|---|---|
| 1 | Cyan | 4.02 | 2.93 | 10.16 | 18.38 | 43.78 | 13.12 |
| 2 | Yellow | 3.36 | 2.76 | 8.99 | 17.9 | 42.71 | 12.79 |
| 3 | Magenta | 6.96 | 3.76 | 8.7 | 17.55 | 33.97 | 11.5 |
| 4 | Yellow | 4.12 | 4.14 | 8.76 | 17.91 | 42.684 | 12.7 |
| 5 | Magenta | 5.05 | 3.75 | 8.75 | 17.66 | 43.761 | 12.61 |
| 6 | Magenta | 6.73 | 3.65 | 8.78 | 17.3 | 40.28 | 12.36 |
| 7 | Cyan | 4.96 | 4.09 | 9.26 | 18.13 | 43.38 | 12.95 |
| 8 (crosslinked Dispersion 3) | Magenta | n/a | n/a | 9.19 | n/a | n/a | 11.51 |
| 9 | Yellow | 3.94 | 3.79 | 8.35 | 18.04 | 42.86 | |
| 10 | Magenta | 7.25 | 4.05 | 8.7 | 16.29 | 33.18 | 8.37 |
| 11 | Magenta | 8.03 | 4.53 | 9.22 | 17.32 | 39.96 | 12.37 |
| 12 | Yellow | 4.52 | 4.95 | 9.29 | 17.82 | 43.11 | 12.73 |
| 13 | Cyan | 5.58 | 4.74 | 9.84 | 17.9 | 44.4 | 12.78 |
| 14 | Magenta | 6.36 | 4.64 | 9.34 | 17.48 | 44.41 | 94.47 |
| 15 (crosslinked Dispersion 10) | Magenta | n/a | n/a | 9.27 | n/a | n/a | 8.37 |
| 16 | Magenta | 6.82 | 4.18 | 9.06 | 17.08 | 43.55 | 12.2 |
| 17 | Cyan | 10.7 | 3.88 | 9.05 | 17.25 | 44.74 | 12.32 |
| 18 | Magenta | 20.8 | 3.68 | 8.64 | 15.33 | 35.24 | 10.95 |
| 19 | Yellow | 5.3 | 4.18 | 8.73 | 17.09 | 43.34 | 12.2 |

Dispersions 1-19 were used to prepare Inks 1-19, and the inks were printed using an Epson B310 printer for single pass printing and an HP8000 for four pass printing. Ink vehicle compositions used are listed in Table 4 below as % by weight based on total weight of ink.

TABLE 4

| Solvents | Ink Vehicle (Epson Printer) | Ink Vehicle (HP printer) |
|---|---|---|
| Dispersion | 4.2% | 4.2% |
| 2-pyrrolidone | 9% | 8.50% |
| Glycereth-26 (LEG-1) | 5% | 2% |
| Tetraethylene glycol | — | 3% |
| 1-(2-hydroxyethyl)-2-pyrrolidone | — | 8% |
| 1,6-hexanediol | — | 3% |
| Surfactants | | |
| Surfynol SE-F | 0.40% | 0.38% |
| Surfynol 465 | 0.70% | — |
| Zonyl FSO | 0.10% | 0.20% |
| Biocide | — | — |
| Proxel GXL | 0.20% | 0.20% |
| Water | Balance to 100% | |

Results of single pass printing on the Epson printer were summarized in Table 5.

TABLE 5

| Ink Example | Xerox 4200 | HP Multipurpose | HP Bright White | HP Brochure | Area Coverage | Average 1-Pass Saturation |
|---|---|---|---|---|---|---|
| 1 | 0.83 | 0.94 | 1.01 | 1.06 | 7.1 | 0.96 |
| 2 | 0.78 | 0.78 | 0.79 | 0.77 | 4.7 | 0.78 |
| 3 | 0.96 | 1.04 | 1.13 | 1.13 | 5.83 | 1.06 |
| 4 | 0.78 | 0.76 | 0.86 | 0.75 | 4.6 | 0.79 |
| 5 | 0.86 | 0.96 | 1.05 | 1.02 | 6.5 | 0.97 |
| 6 | 1.00 | 1.05 | 1.12 | 1.07 | 6.3 | 1.06 |
| 7 | 0.81 | 0.93 | 0.99 | 1.04 | 7.2 | 0.94 |
| 8 | 0.95 | 1.04 | 1.21 | 1.23 | 6.7 | 1.11 |
| 9 | 0.78 | 0.77 | 0.79 | 0.75 | 4.7 | 0.77 |

TABLE 5-continued

| Ink Example | Xerox 4200 | HP Multi-purpose | HP Bright White | HP Brochure | Area Coverage | Average 1-Pass Saturation |
|---|---|---|---|---|---|---|
| 10 | 0.95 | 1.05 | 1.15 | 1.10 | 6.36 | 1.06 |
| 11 | 0.98 | 1.00 | 1.17 | 1.09 | 5.9 | 1.06 |
| 12 | 0.77 | 0.77 | 0.84 | 0.74 | 4.5 | 0.78 |
| 13 | 0.80 | 0.92 | 0.98 | 1.03 | 7.8 | 0.93 |
| 14 | 0.87 | 0.94 | 1.05 | 1.01 | 6.2 | 0.97 |
| 15 | 0.96 | 1.07 | 1.21 | 1.21 | 6.7 | 1.11 |
| 16 | 0.96 | 1.08 | 1.10 | 1.19 | 6.4 | 1.08 |
| 17 | 0.82 | 0.90 | 0.97 | 1.04 | 6.8 | 0.93 |
| 18 | 0.99 | 1.04 | 1.14 | 1.03 | 6.2 | 1.05 |
| 19 | 0.78 | 0.76 | 0.83 | 0.73 | 4.4 | 0.78 |

Results of multipass printing on the HP printer were summarized in Table 6 below.

TABLE 6

| Ink | Xerox 4200 | HP Multipurpose | HP Bright White | HP Brochure |
|---|---|---|---|---|
| 1 | 0.97 | 1.03 | 1.09 | 1.19 |
| 2 | 0.87 | 0.85 | 0.90 | 0.92 |
| 3 | 1.08 | 1.19 | 1.30 | 1.44 |
| 4 | 0.82 | 0.84 | 0.92 | 0.90 |
| 5 | 1.01 | 1.10 | 1.20 | 1.31 |
| 6 | 1.10 | 1.18 | 1.31 | 1.45 |
| 7 | 0.91 | 1.05 | 1.12 | 1.21 |
| 8 | 1.08 | 1.22 | 1.36 | 1.56 |
| 9 | 0.84 | 0.86 | 0.88 | 0.93 |
| 10 | 1.08 | 1.21 | 1.31 | 1.41 |
| 11 | 1.06 | 1.19 | 1.30 | 1.43 |
| 12 | 0.81 | 0.85 | 0.89 | 0.88 |
| 13 | 0.89 | 1.04 | 1.12 | 1.21 |
| 14 | 0.99 | 1.12 | 1.22 | 1.32 |
| 15 | 1.05 | 1.24 | 1.37 | 1.54 |
| 16 | 1.07 | 1.23 | 1.29 | 1.49 |
| 17 | 0.91 | 1.03 | 1.09 | 1.21 |
| 18 | 1.07 | 1.22 | 1.31 | 1.47 |
| 19 | 0.83 | 0.86 | 0.90 | 0.91 |

What is claimed is:

1. An aqueous pigment dispersion comprising a dispersed pigment, an aqueous carrier and a polymeric dispersant; wherein said polymeric dispersant is a random or structured polymer and comprising at least three monomers A, B and C; wherein monomer A is a hydrophobic acrylate monomer, monomer B is a hydrophilic acrylic monomer, and monomer C is an acrylate monomer with the O atom on the ester bonding, either directly or via a linking group containing 1-10 carbon atoms, to a carbon or heteroatom of a monocylic or bicyclic heterocycle containing N, S or O atoms on the ring, wherein said heterocycle is selected from the group consisting of imidazole, oxazolidinone, thiazolidinone, benzimidazole, triazole, thiazole, benzothiazole, pyrimidine, pyridazine and glycoside, and wherein the carbon atoms on the ring of said heterocycle are optionally substituted with one or more $R^1$, $OR^2$, $SR^2$ or $NR^3R^4$, and the N atom or atoms on the ring of said heterocycle are optionally substituted with $R^1$ or $-R^5OR^2$;

each $R^1$ is independently $C_1$-$C_{20}$ alkyl, $C_3$-$C_{20}$ cycloalkyl or $C_6$-$C_{40}$ aryl;

each $R^2$ is independently H, $C_1$-$C_{20}$ alkyl, $C_3$-$C_{20}$ cycloalkyl or $C_6$-$C_{40}$ aryl; and each $R^3$ and $R^4$ are independently H, $C_1$-$C_{20}$ alkyl, $C_3$-$C_{20}$ cycloalkyl or $C_6$-$C_{40}$ aryl; and each $R^5$ is $C_1$-$C_5$ alkyl.

2. The aqueous pigment dispersion of claim 1 wherein the polymeric dispersant has between 10 to 80 weight % of monomer A, between 5 to 50 weight % of monomer B and between 5 to 50 weight % of monomer C.

3. The aqueous pigment dispersion of claim 1 wherein said heterocycle is imidazole.

4. The aqueous pigment dispersion of claim 1 wherein said heterocycle is oxazolidinone.

5. The aqueous pigment dispersion of claim 1 wherein said heterocycle is thiazolidinone.

6. The aqueous pigment dispersion of claim 1 wherein said heterocycle is benzimidazole.

7. The aqueous pigment dispersion of claim 1 wherein said heterocycle is triazole.

8. The aqueous pigment dispersion of claim 1 wherein said heterocycle is thiazole.

9. The aqueous pigment dispersion of claim 1 wherein said heterocycle is benzothiazole.

10. The aqueous pigment dispersion of claim 1 wherein said heterocycle is pyrimidine.

11. The aqueous pigment dispersion of claim 1 wherein said heterocycle is pyridazine.

12. The aqueous pigment dispersion of claim 1 wherein said heterocycle is glycoside.

* * * * *